United States Patent [19]
Wang et al.

[11] Patent Number: 6,139,910
[45] Date of Patent: Oct. 31, 2000

[54] FABRICATION PROCESS OF LITHIUM NIOBATE TE/TM POLARIZATION SPLITTERS USING ZINC AND NICKEL DIFFUSIONS

[75] Inventors: Way-Seen Wang; Yu-Pin Liao; Ruei-Chang Lu; Rei-Shin Cheng; Chih-Hua Yang; Shung-Jung Lin, all of Taipei, Taiwan

[73] Assignee: National Science Council, Taipei, Taiwan

[21] Appl. No.: 08/777,812

[22] Filed: Dec. 31, 1996

[51] Int. Cl.⁷ .............................................. B05D 5/06
[52] U.S. Cl. ............... 427/163.2; 427/379; 427/383.3; 427/394; 427/261; 427/269; 427/404
[58] Field of Search ............... 427/163.2, 383.3, 427/379, 399, 261, 269, 404

[56] References Cited

U.S. PATENT DOCUMENTS 4,100,313  7/1978  Hammer ........................... 427/163.2

OTHER PUBLICATIONS

Wei, et al. "ATE–TM Mode Splitter on Lithium Niobate Using Ti, Ni, and MgO Diffusions." *IEEE Photonics Technology Letters*, Feb., 1994, vol. 6, No. 2, p. 245.

P.K. Wei and W.S. Wang. "Novel TE–TM Mode Splitter on Lithium Niobate Using Nickel Indiffusion and Proton Exchange Techniques." *Electronics Letters*, Jan. 6, 1994, vol. 30, No. 1, p. 35.

Liao, et al. "Nickel–Diffused Lithium Niobate Optical Waveguide with Process–Dependent Polarization." *IEEE Photonics Technology Letters*. Apr. 1996, vol. 8, No. 4, p548.

Liao, et al, "Passive NiLiNbO₃ Polarisation Splitter at 1.3 μm Wavelength." *Electronics Letters*. May 23, 1996. vol. 32, No. 11, pp1003–1004.

*Primary Examiner*—Janyce Bell
*Attorney, Agent, or Firm*—Smith, Gambrell & Russell, LLP

[57] ABSTRACT

This is a fabrication process for Y-branch nickel/zinc-indiffused polarization splitters on lithium niobate. The fabrication technology needs only two nickel/zinc indiffusions; one at a high temperature and the other at a lower temperature. Nickel/zinc-indiffused waveguides can support single-ordinary, single-extraordinary, and random polarization waves depending on the fabrication process parameters. High extinction ratios can be achieved due to the inherent single-polarization of the waveguides. The splitting ratios of the TE and TM modes are sufficiently high for practical applications.

16 Claims, 28 Drawing Sheets

element input terminal
FABRICATION PROCESS OF LITHIUM NIOBATE TE/TM POLARIZATION SPLITTERS USING ZINC AND NICKEL DIFFUSIONS

BACKGROUND OF THE INVENTION

This invention is a process for manufacturing lithium niobate polarization splitters using nickel (or zinc) diffusion. Y-branch polarization splitters, which are the product of this invention, have high extinction ratio and can meet the requirements of practical applications.

According to U.S. Pat. No. 5,436,992, the manufacturing process for the polarization splitter using a single-polarization waveguide on lithium niobate (shown in FIG. 1) includes 3 manufacturing techniques: titanium diffusion (for producing a common (ordinary) and uncommon (extraordinary) polarized light waveguide), nickel diffusion (for producing an ordinary polarized light waveguide) and magnesium oxide diffusion or proton exchange method (for producing an extraordinary polarized light waveguide). By using the characteristics of single polarization waveguide elements, the device can have high extinction ratios. Since it takes three manufacturing techniques to produce these elements, the manufacturing process is not simple enough for practical applications.

SUMMARY OF THE INVENTION

The principle of the present invention is that under different manufacturing conditions, nickel (or zinc) diffusion into lithium niobate can make a single waveguide of ordinary polarized light, a single waveguide of extraordinary polarized light and a waveguide for both ordinary and extraordinary polarized light. Using nickel (or zinc) diffusion techniques to fabricate the polarization splitter only two diffusion steps are needed. The present process is simpler than other processes and is suitable for mass production in industry.

This invention is a manufacturing process for a Y-branch polarization splitter by nickel (or zinc) diffusion in lithium niobate. This process only needs two nickel (or zinc) diffusions. One is a high temperature diffusion and the other is lower temperature diffusion. Since the polarization direction of the waveguide is dependent on the conditions of the manufacturing process, the waveguide can be produced as follows: a single waveguide of ordinary polarized light, a single waveguide of extraordinary polarized light and a waveguide for both ordinary and extraordinary polarized light. The Y type polarization splitter which is manufactured by the process of nickel (or zinc) diffusion has a high extinction ratio and can meet the requirements of practical applications.

The purpose of this invention is to offer a convenient manufacturing process for a polarization splitter. The high extinction ratio polarization splitter can be manufactured using only nickel (or zinc) diffusion.

Figure 1:
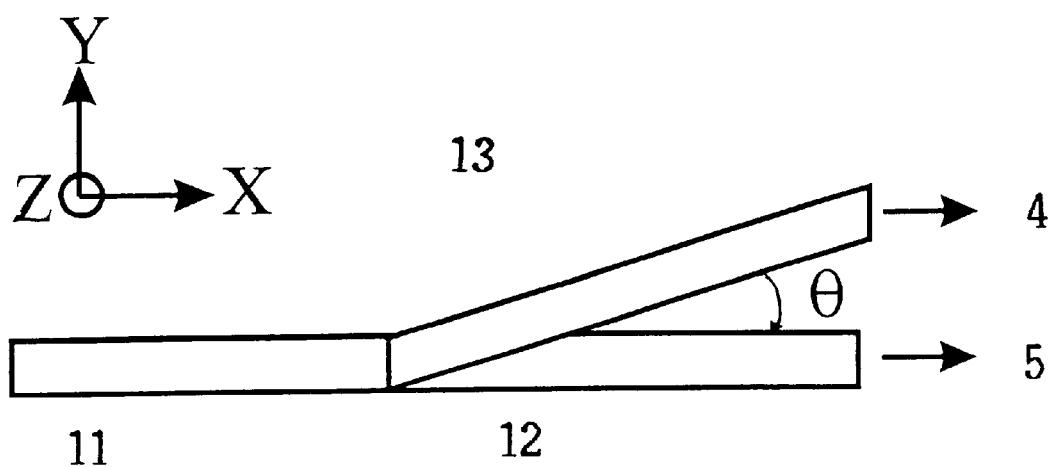
FIG. 1 shows a schematic diagram of the polarization splitter using three different diffusions.
Figure 1:
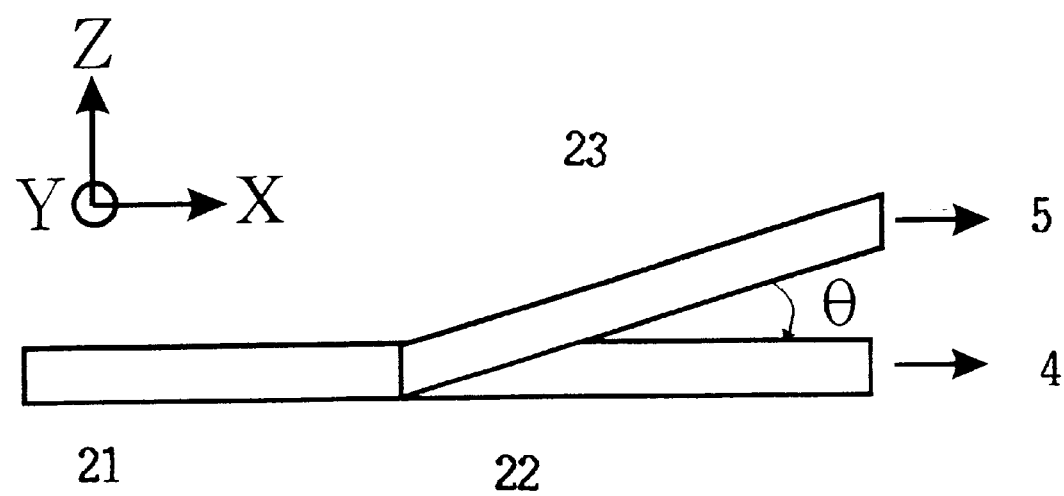

REFERENCE NUMBER OF THE ATTACHED DRAWINGS:

1 . . . element input terminal
2 . . . straight branch
3 . . . bent branch
4 . . . transverse electric (TE) mode
5 . . . transverse electric (TM) mode
6 . . . photoresist
11,21 . . . titanium-indiffused (TI) waveguide
12 . . . proton-exchanged (PE) waveguide
13,23 . . . nickel-indiffused (NI) waveguide
22 . . . magnesium-oxide-induced lithium outdiffusion (MILO) waveguide
10,100 . . . Z cut lithium niobate ($LiNbO_3$) chip
20,30,200,600 . . . nickel (Ni)
40 . . . zirconium oxide ($ZrO_2$)
50 . . . thickness of nickel
300,400 . . . zinc (Zn)
500 . . . titanium (Ti)
502 . . . titanic oxide ($TiO_2$)

DETAILED DESCRIPTION OF THE INVENTION

Recently, a manufacturing process for the present polarization splitter was published by the inventor in *IEEE PHOTONICS TECHNOLOGY LETTERS*, Vol. 8,4, pp. 548–550, 1996. It has been found that nickel and zinc diffusion into lithium niobate separately or nickel and zinc diffusion into lithium niobate at the same time, under different manufacturing conditions, can manufacture waveguides for ordinary polarized light, waveguides for extraordinary polarized light and waveguides for both ordinary and extraordinary polarized light.

A nickel diffusion lithium niobate waveguide, under different manufacturing conditions, will have different polarization characteristics. A certain thickness of nickel, if its diffusion depth is superficial to a certain level, can produce a waveguide which can only guide light in an extraordinary polarized direction; if the diffusion depth is deep enough, a waveguide is produced which can only guide light in a ordinary polarized direction, and if the diffusion depth is between the depths mentioned above, a waveguide is produced which will guide light in random polarized directions. In another situation, if the thickness of nickel is thin to a certain level, a waveguide is produced which will only guide the light in a ordinary polarized direction. If the thickness of nickel is thicker than the critical thickness, a waveguide is produced that will guide light in random polarized directions. Zinc diffusion waveguide have the same characteristics as mentioned above, and zinc diffusion along with nickel also has the same characteristics.

Figure 2:
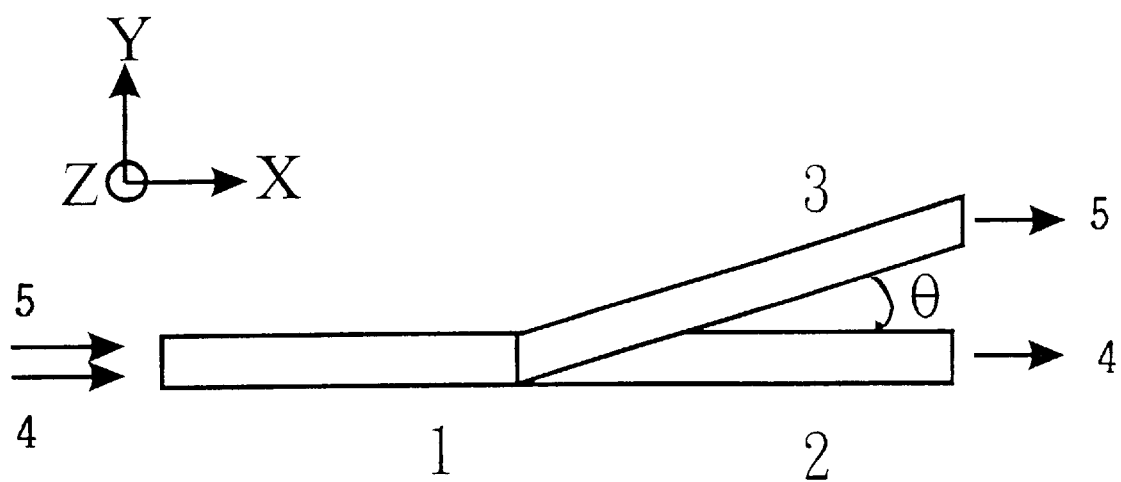
FIG. 2 shows a schematic diagram of the polarization splitter using nickel diffusion, zinc diffusion, or both.
Figure 3A:
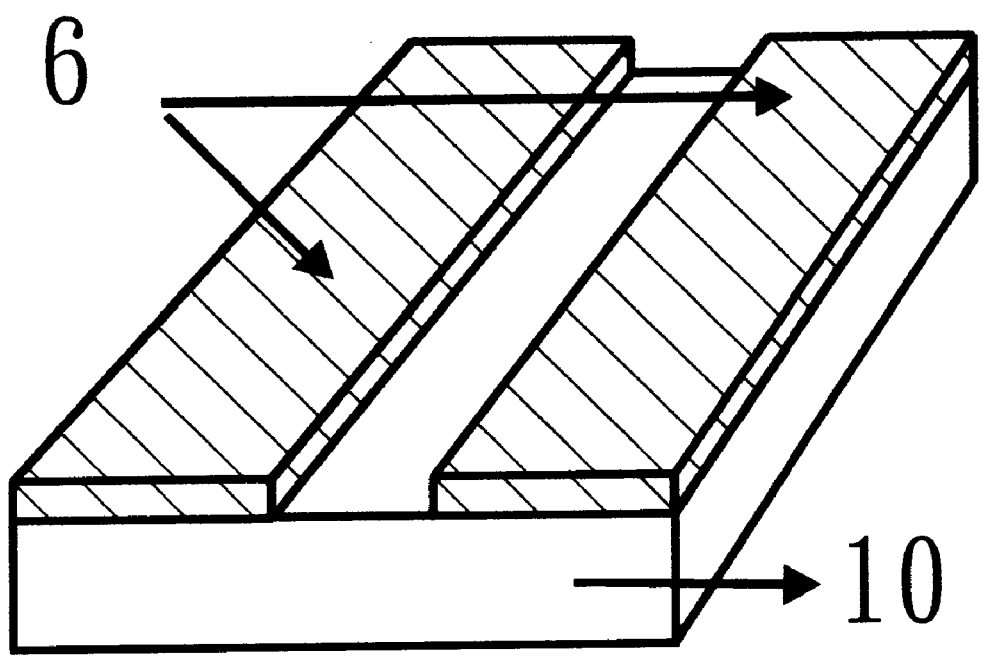
FIGS. 3a, 3b, 3c, 3d, 3e, 3f, 3g and 3h shows a nickel diffusion process for the splitter.
Figure 3B:
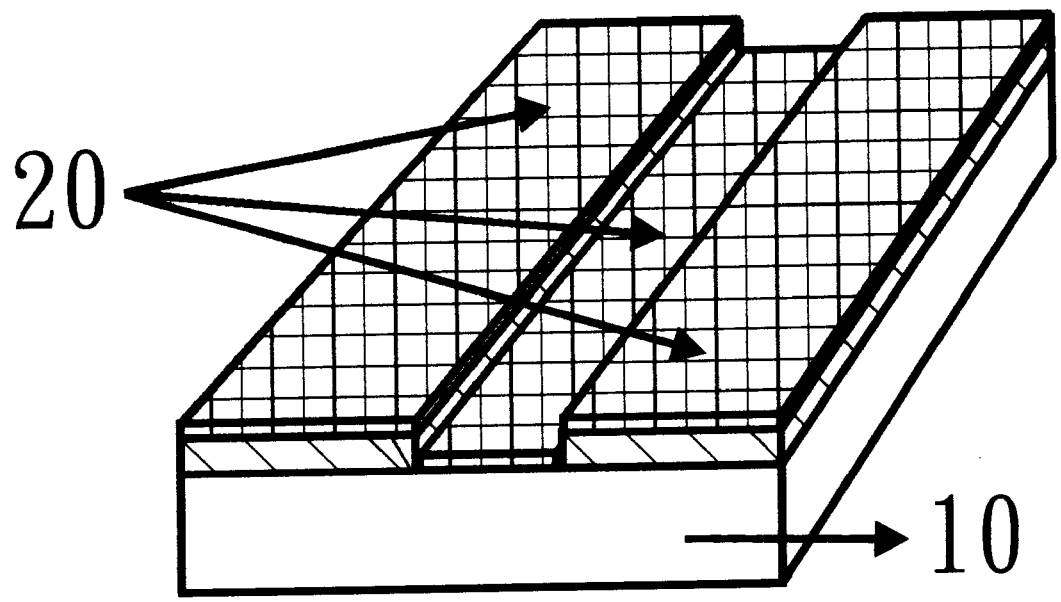
Figure 3C:
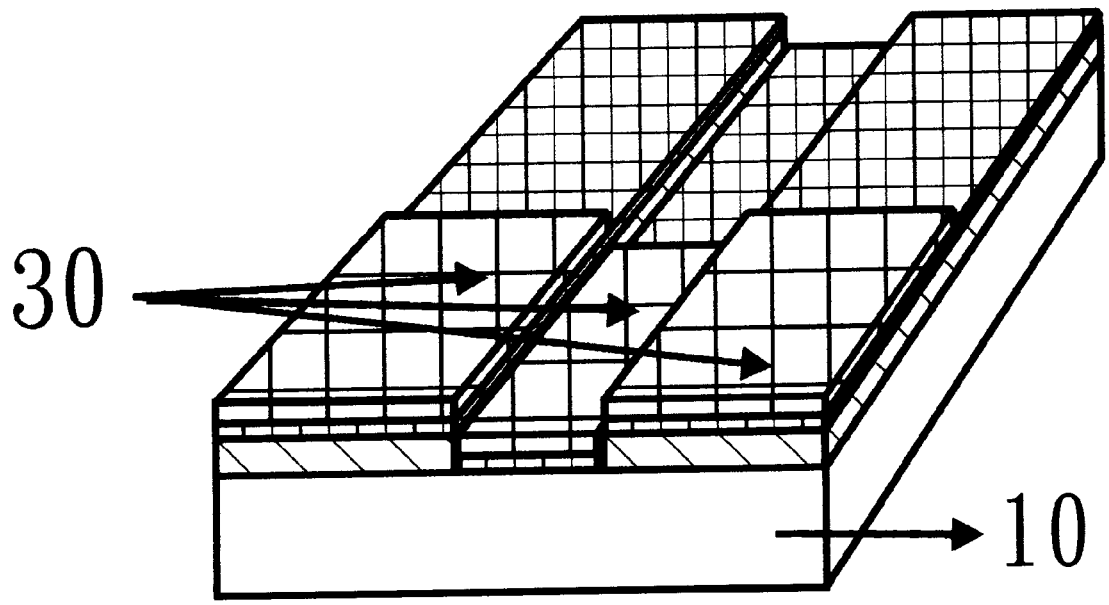
Figure 3D:
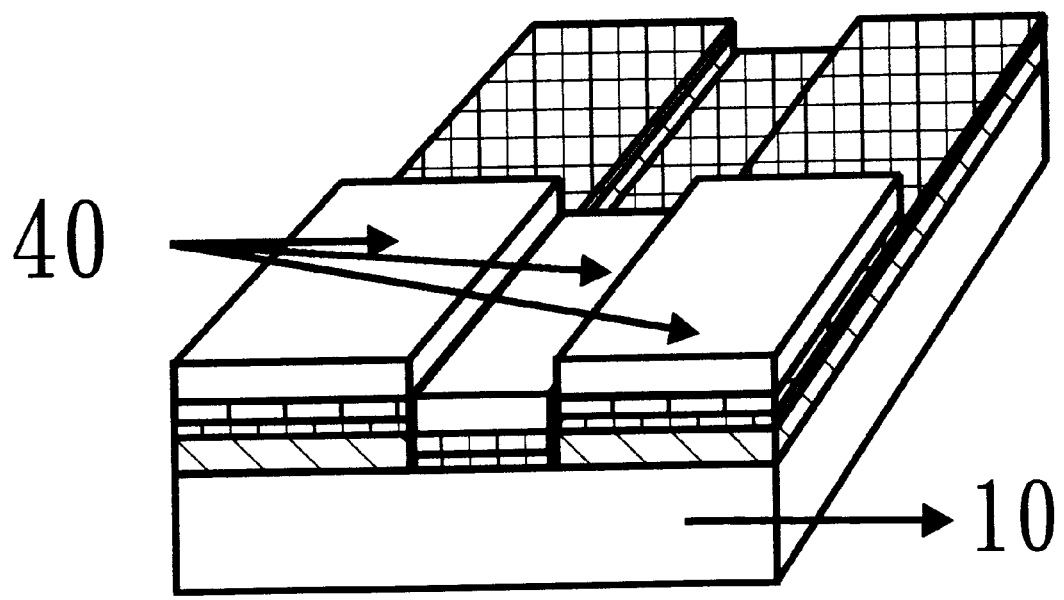
Figure 3E:
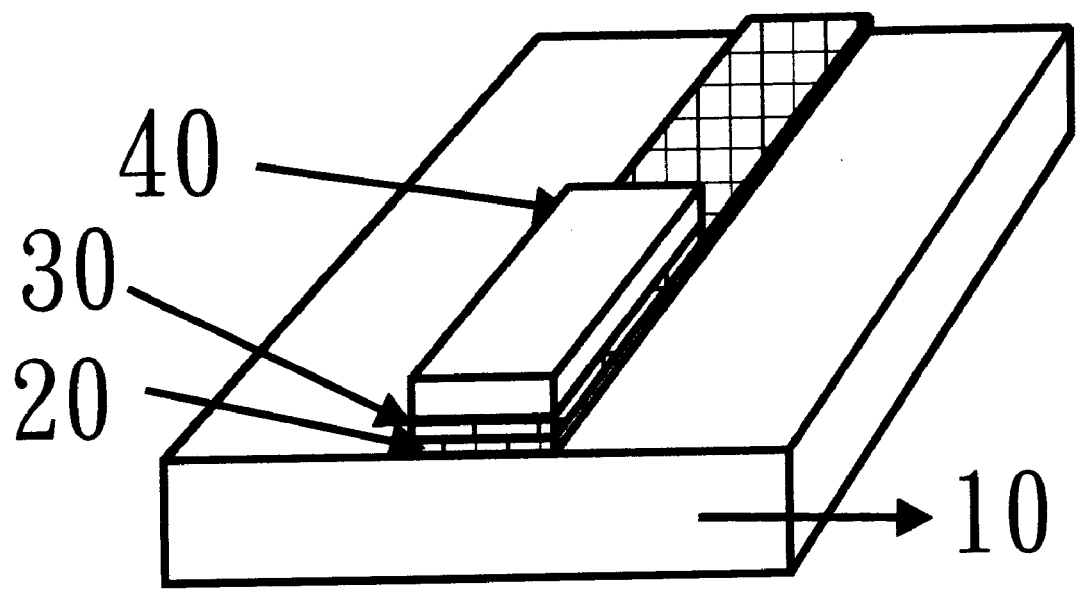
Figure 3F:
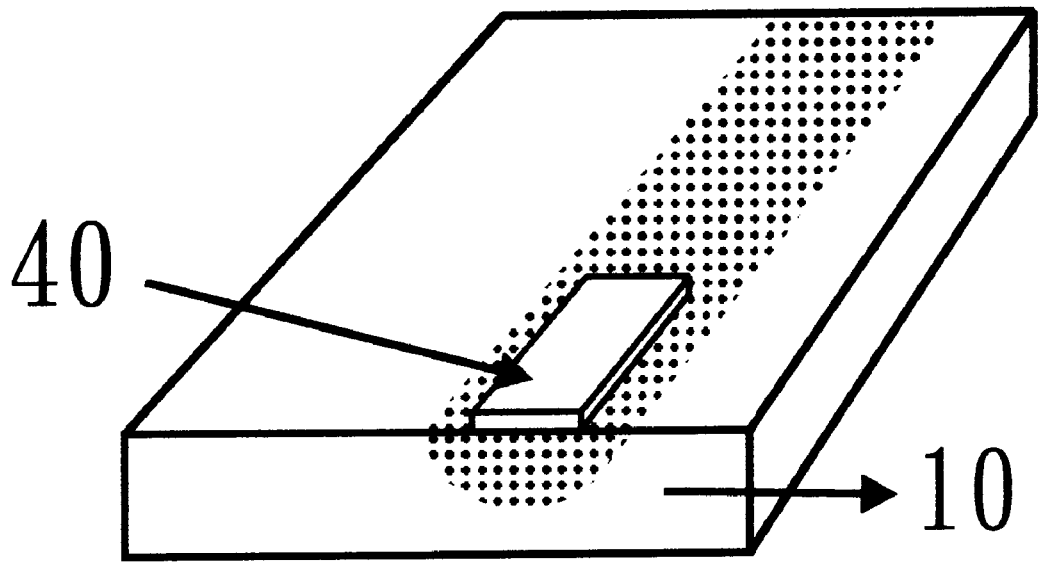
Figure 3G:
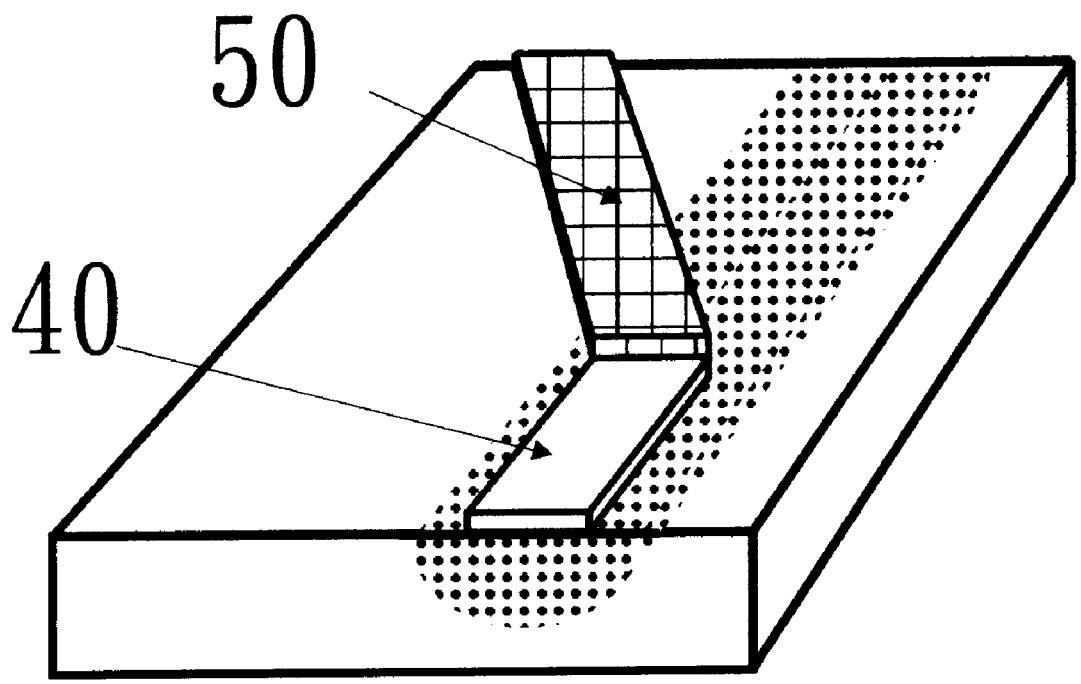
Figure 3H:
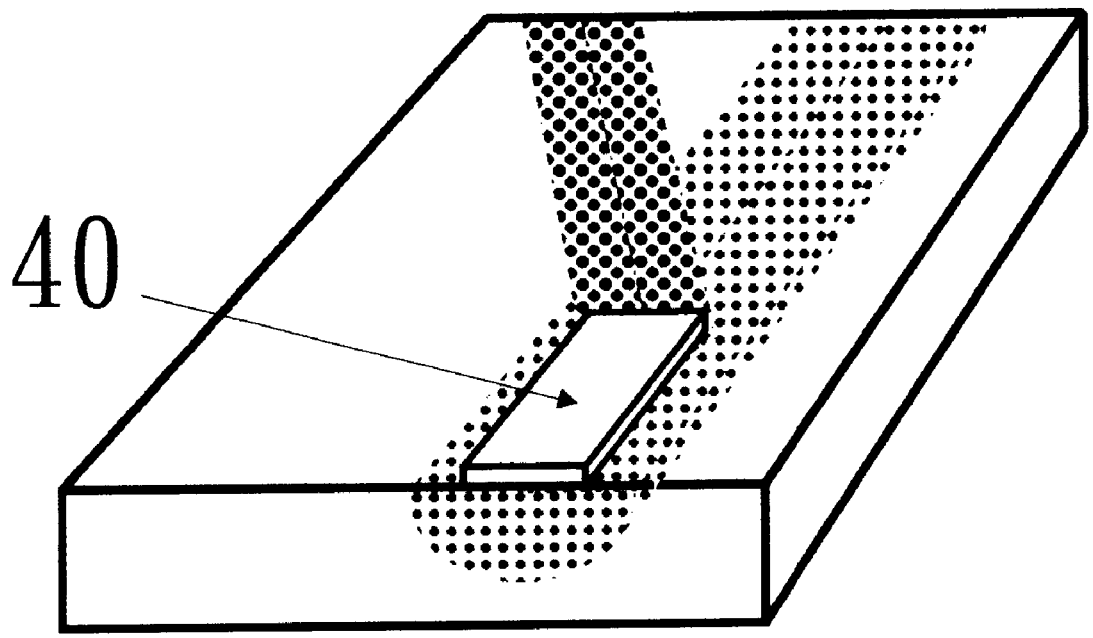
Figure 4A:
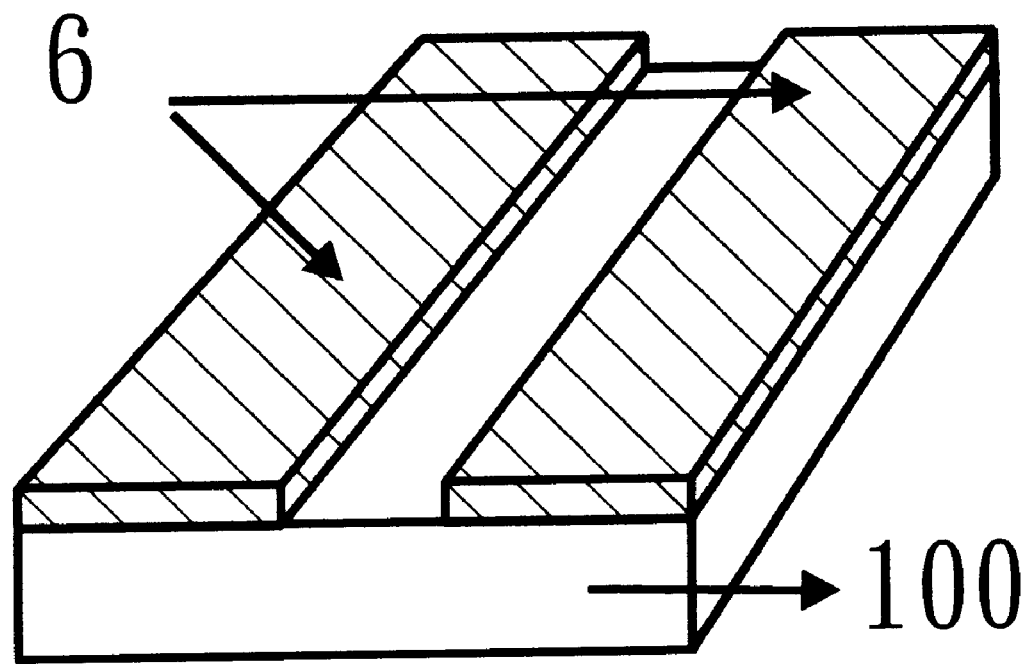
FIGS. 4a, 4b, 4c, 4d, 4e, 4f, 4g, 4h, and 4i show a zinc and nickel diffusion process for the splitter.
Figure 4B:
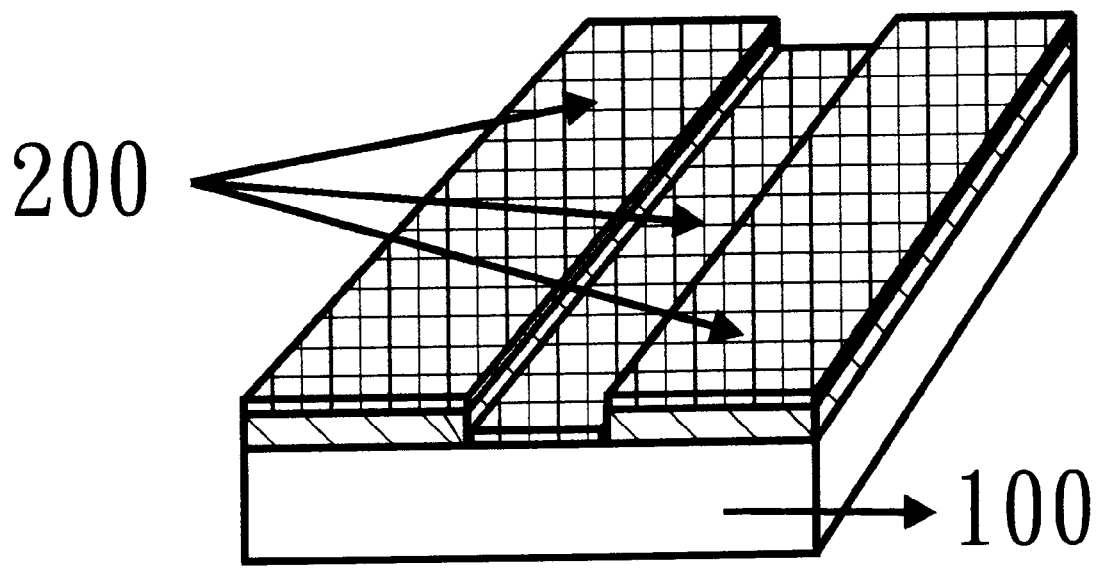
Figure 4C:
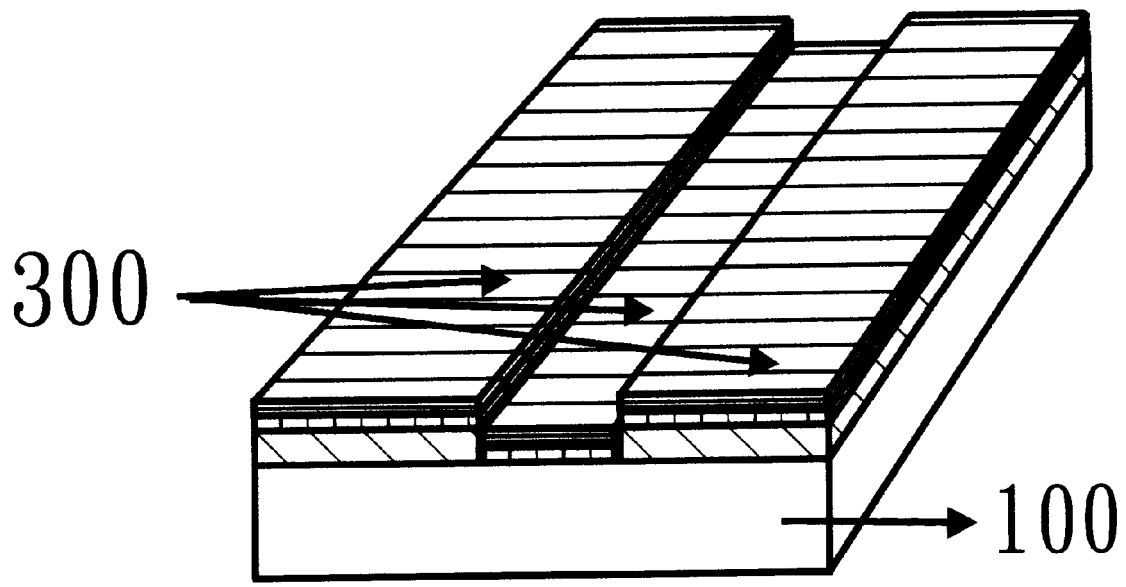
Figure 4D:
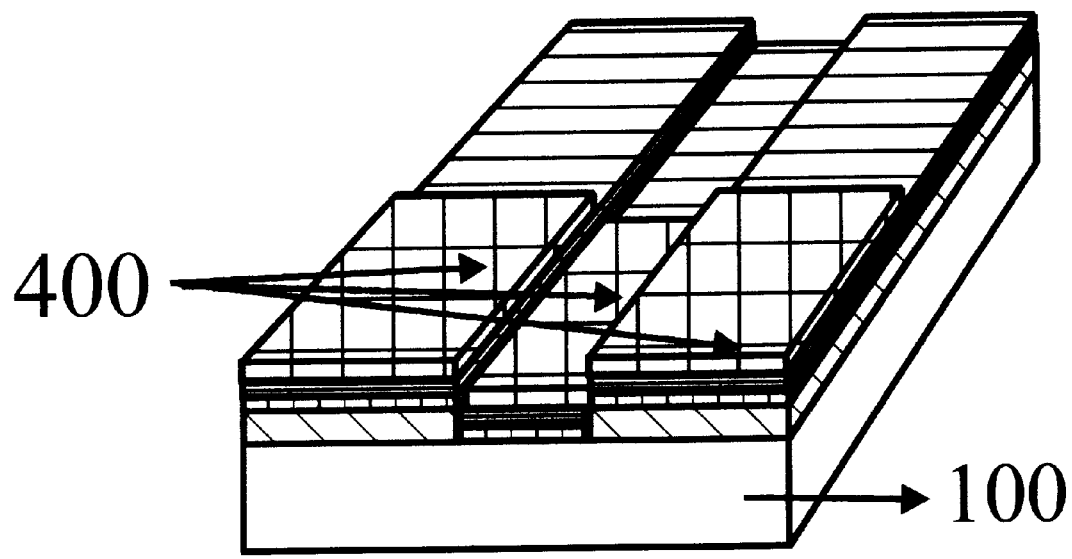
Figure 4E:
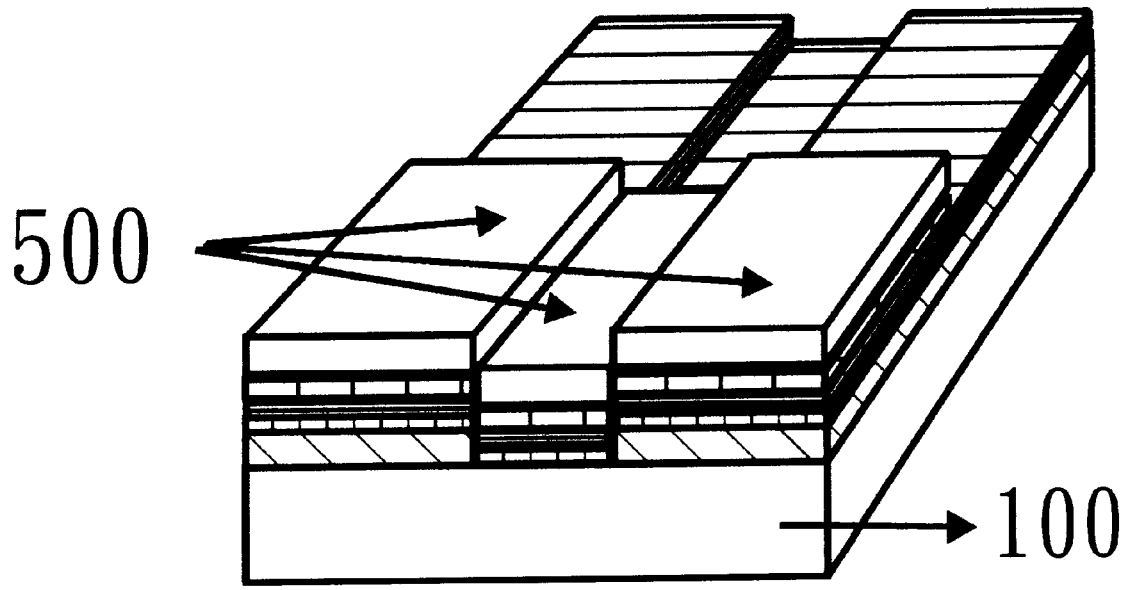
Figure 4F:
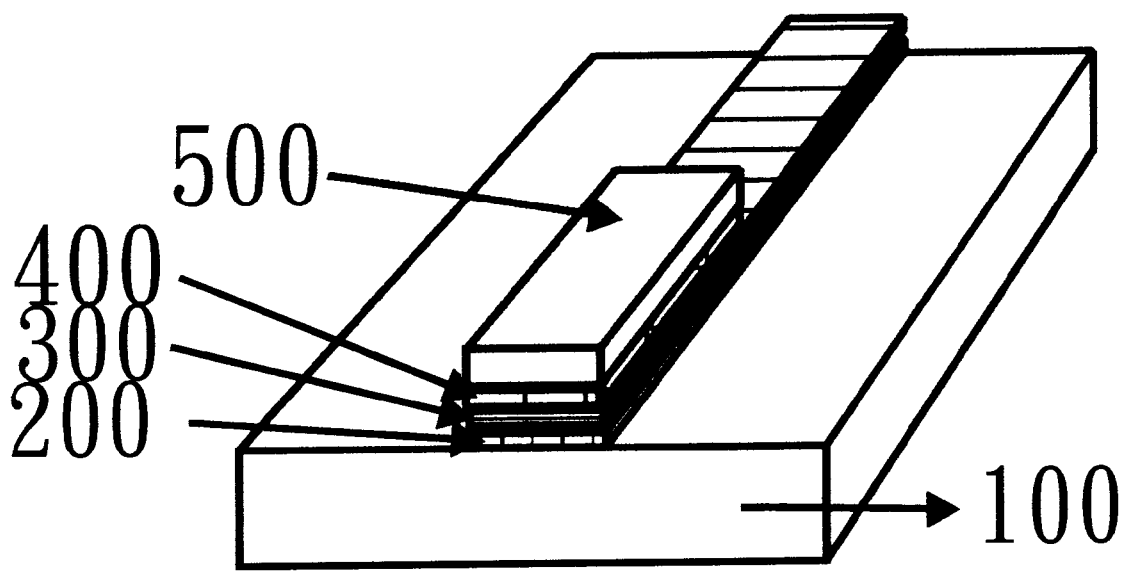
Figure 4G:
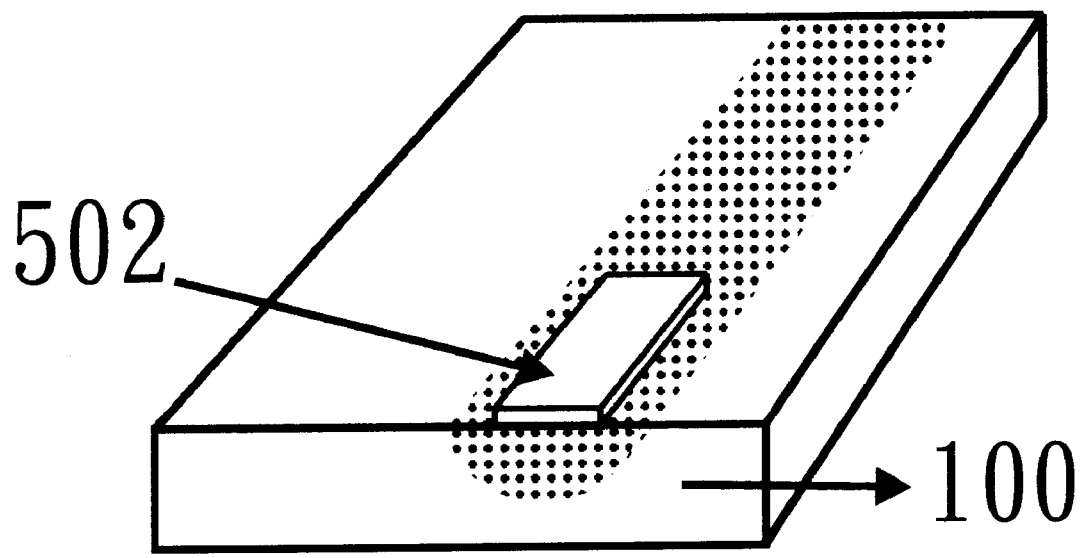
Figure 4H:
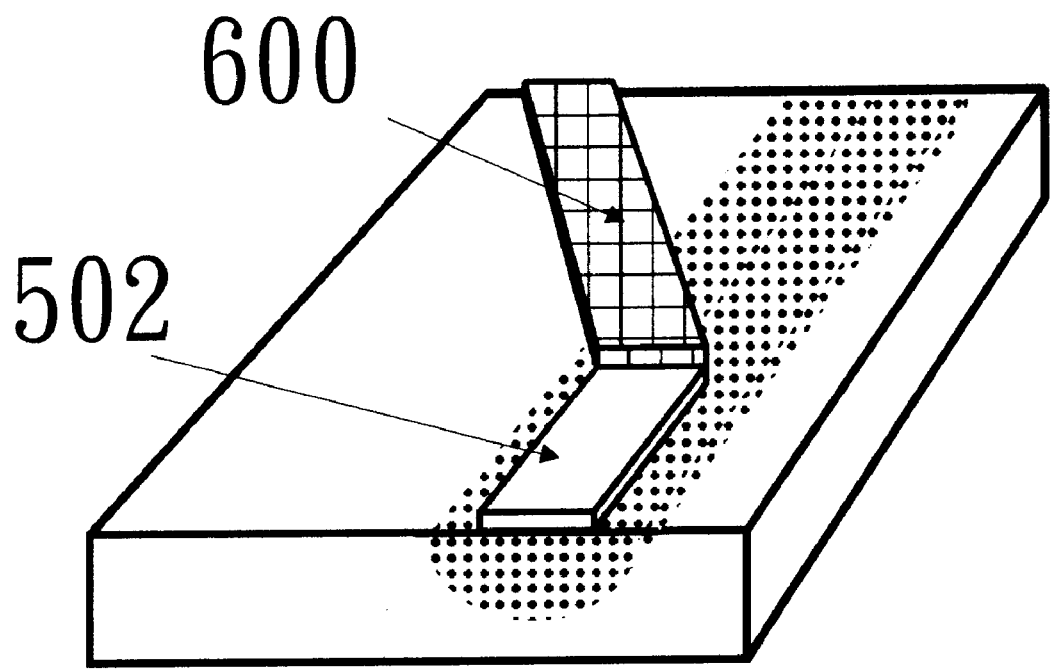
Figure 4I:
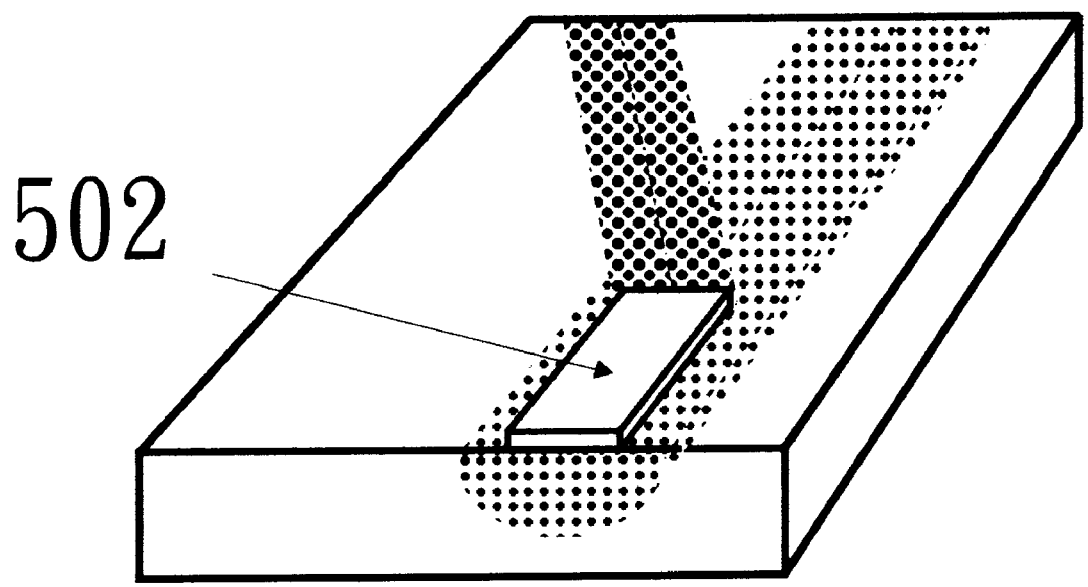

The invention which makes use of nickel diffusion to make the polarization splitter is shown in FIG. 2. It is an unsymmetric Y-branch configuration and the splitting angle is $\theta$. The input terminal 1 is the waveguide guiding the light in randomly polarized directions; branch 2 is the waveguide only guiding the light in the ordinary polarized direction and branch 3 is the waveguide only guiding the light in the extraordinary polarized direction.

The invention which makes use of two nickel diffusions to manufacture the polarization splitter is shown in FIG. 3:

(a) First, a light cover erosion (photoresist) technique is used to erode a strip concavity on a Z cut LiNbO$_3$ (10) chip.

(b) A layer of Ni (20) is deposited.

(c) A portion of the LiNbO$_3$ (10) chip is covered with a silicon chip on a layer of Ni (30) is deposited.

(d) A layer of ZrO$_2$ (40) is deposited.

(e) The photoresist is washed off with organic solvent; for example acetone, and this step will cause two sections with different thicknesses to be formed; one is element's input terminal and the other is branch 2.

(f) The first diffusion is performed on both sections at the same time, under high temperature for a short time period. Ni (20) and Ni (30) will diffuse into lithium niobate chip. The section with thinner nickel layer will produce the single ordinary polarized light waveguide, and the section with thicker nickel layer will produce the random polarized light waveguide. ZrO$_2$ (40) will be left on the surface as the mark of input terminal waveguide.

(g) The light cover erosion (photoresist) technique are used and vacuum techniques to erode a strip concavity with a slope angle connecting with the ZrO$_2$ (40); then Ni (50) is plated on branch 3 with the thickness needed by branch 3 to form a Y-branch configuration. The photoresist is washed out.

(h) The second diffusion is performed under lower temperature. Thus, input terminal 1 and branch 2 are diffused twice, once under high temperature and once under lower temperature. The branch is formed with one diffusion under lower temperature.

ZrO$_2$ (40) can be substituted by titanium, titanium oxide, zinc, zinc oxide, magnesium oxide, silicon, silicon oxide, aluminum or aluminum oxide. Either Ni (20) or Ni (30) can be substituted by zinc. Ni (50) can also be substituted by zinc.

The other method of this invention uses zinc and nickel diffusion at the same time to make the polarization splitter.

The process is similar to the process for making the lithium niobate polarization splitter by two nickel diffusions. The technique is diagrammed FIG. 4:

(a) First, a light cover erosion (photoresist) technique is used to erode a strip concavity on a Z cut LiNbO$_3$ (100) chip.

(b) A layer of Ni (200) is deposited.

(c) A layer of on Zn (300) is deposited.

(d) A portion of the LiNbO$_3$ (100) chip is covered with a silicon chip by vertical strip direction and a layer of Zn (400) is deposited.

(e) A layer of Ti (500) is deposited.

(f) The photoresist is washed off with organic solvent, for example acetone, and this step will cause two sections with different thicknesses to be formed; one is element's input terminal and the other is branch 2.

(g) The first diffusion is performed on both sections at the same time, under high temperature for a short time period causing zinc and nickel to diffuse into the lithium niobate chip. The section with thinner nickel layer will produce the single ordinary polarized light waveguide, and the section with the thicker nickel layer will produce the random polarized light waveguide. The titanium will turn into TiO$_2$ (502) and be left on the surface as the mark of input terminal waveguide.

(h) The light cover erosion (photoresist) technique is used to erode a strip concavity with a slope angle connecting with the TiO$_2$ (502); then a layer of Ni (600) is deposited on branch 3 with the thickness needed by branch 3 to form a Y-branch configuration by the vacuum technique.

(i) The second diffusion is performed under lower temperature. Thus, input terminal 1 and branch 2 are diffused twice, once under high temperature and once under lower temperature. The branch 3 is formed with one diffusion under lower temperature.

Ti (500) can be substituted by zinc, zinc oxide, magnesium oxide, silicon, silicon oxide, aluminum, aluminum oxide or zirconium oxide. Ni (600) can be substituted by zinc, and Zn (400) can be substituted by nickel.

The process parameters for the extraordinary polarized light waveguide, ordinary polarized plane light waveguide, and the random polarized light waveguide are summarized below:

(1) Deposit nickel (or zinc), or both nickel and zinc 1–12 μm wide, 20–1500 Å thick on lithium niobate.

(2) Oxidize for 0.5–3 hours, under 300–500° C.

(3) Diffuse for 0.5–6 hours, under 600–1000° C.

In order to assist with the understanding of the method and effect of this invention, the following examples are provided to describe the best mode. The invention should not be limited to these specific examples.

EXAMPLE 1

Manufacturing Process for a Nickel Indiffused Polarization Splitter

Figure 5A:
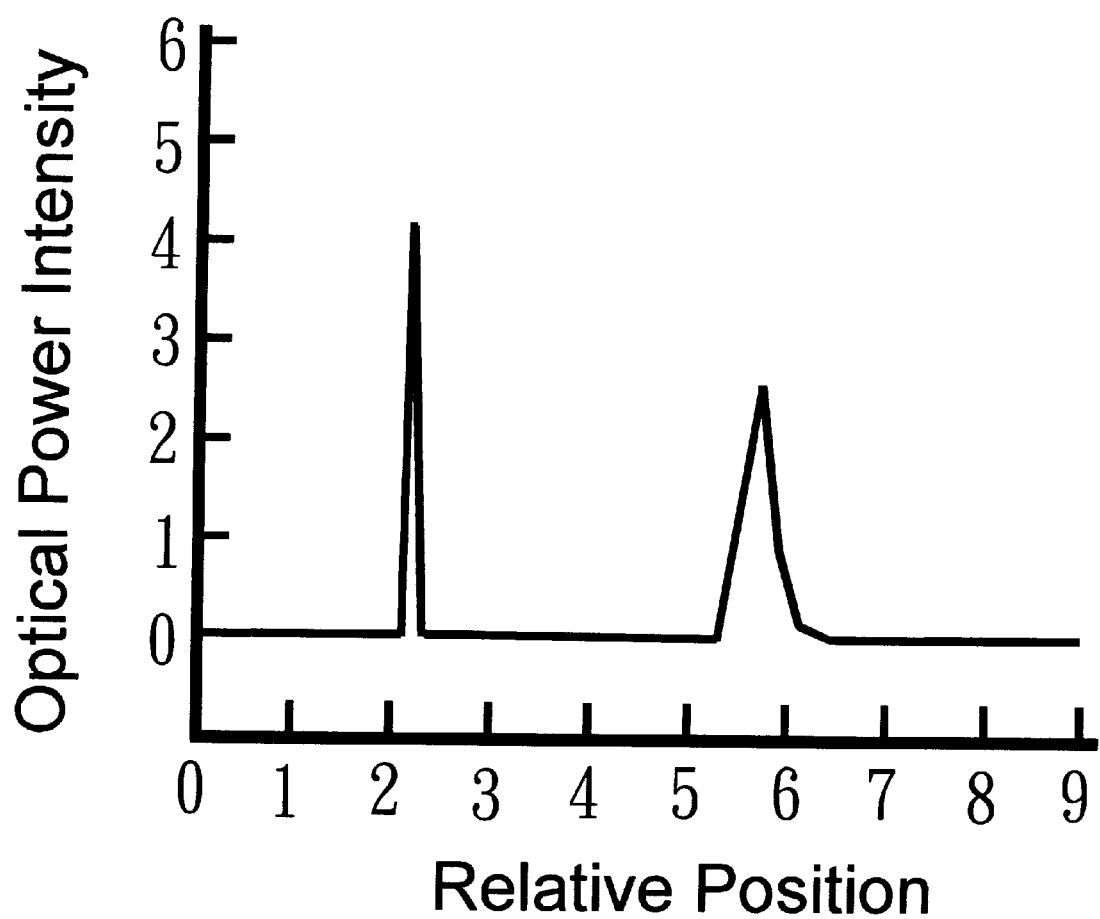
FIGS. 5(a), 5b, and 5c show measured output power intensity profiles of the splitter with $\theta=1°$.

The splitter was manufactured by the technique shown in FIG. 3 and with the manufacturing process parameters shown on Table 1 to yield a nickel-indiffused polarization splitter operating at 0.6238 μm wavelength. The configuration of element is shown on FIG. 2. When the branch angle θ=1°, its operation characteristics, shown as FIG. 5(a), (b), (c), are light signals whose polarization directions have 45°, 0°, 90° angle with the Z axis respectively. When polarization is 45° to the Z axis, both branch 1 and branch 2 have signals and can be recognized from FIG. 5(a). When the polarization direction has a 0° angle to the Z axis, only branch 2 has a signal. When polarization direction has a 90° angle with Z axle, only branch 1 has signal. At 0.6328 μm, TE and TM model extinction ratios are 21 dB and 18 dB, respectively.

EXAMPLE 2

Manufacturing Process for a Nickel Indiffused Polarization Splitter

Figure 6:
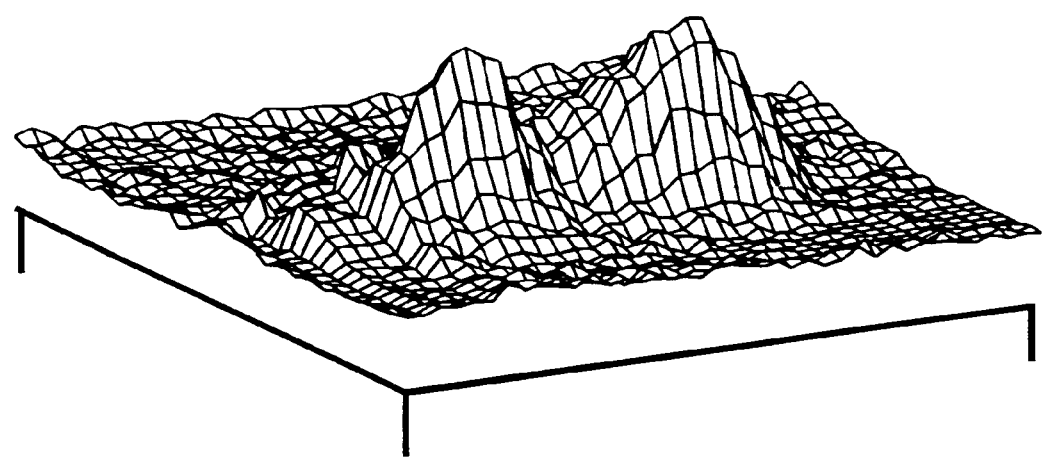
FIGS. 6a, 6b and 6c show measured output power intensity profiles of the splitter with $\theta=0.5°$.
Figure 6:
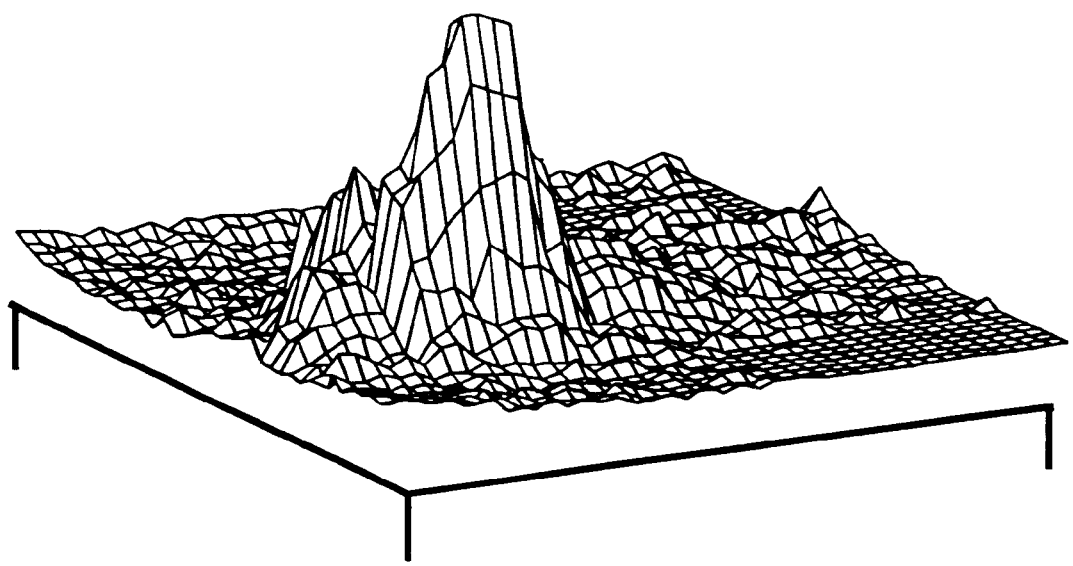
Figure 6:
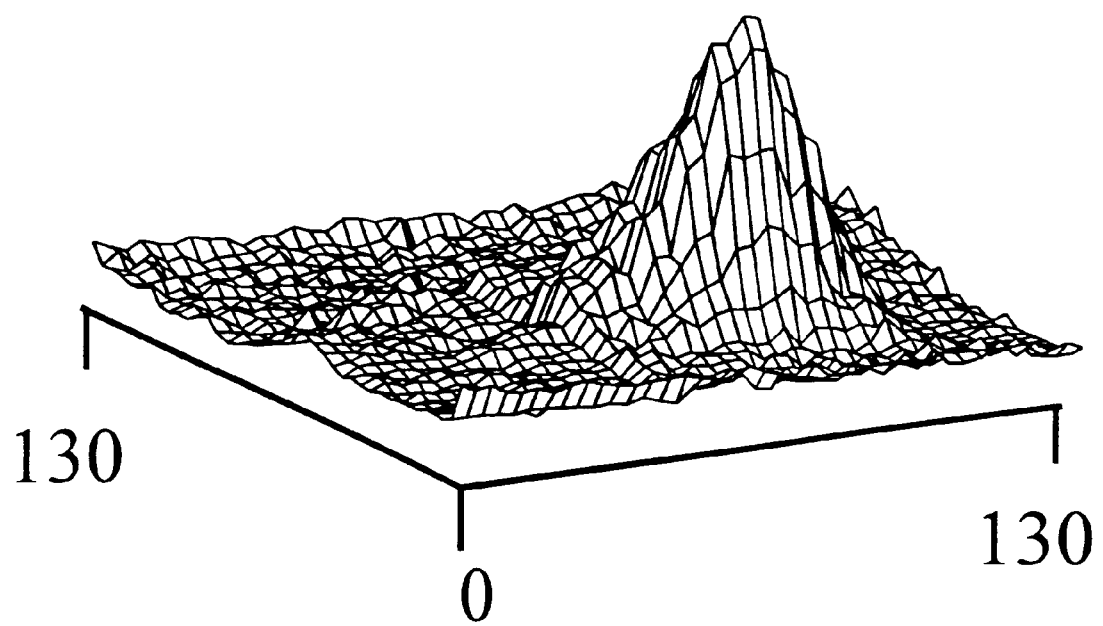

The splitter was manufactured by the technique shown in FIG. 3 and with the manufacturing process parameters shown on Table 2 to yield a nickel indiffused polarization splitter operating at 1.3 μm wavelength. The configuration of element is shown on FIG. 2. When the branch angle θ=0.5, its operation characteristics, shown as FIG. 6(a), (b), (c), are light signals whose polarization directions have 45°, 0°, 90° angle with the Z axis, respectively. When polarization direction is a 45° angle with Z to the Z axis, both branch 1 and branch 2 have signals and can be recognized from FIG. 6(a). When the polarization direction has a 0° angle to the Z-axis, only branch 2 has a signal.

When the polarization direction has a 90° angle with the Z-axis, only branch 1 has signal. At 1.3 μm, TE and TM mode extinction ratios are 23 dB and 21 dB, respectively.

Figure 5B:
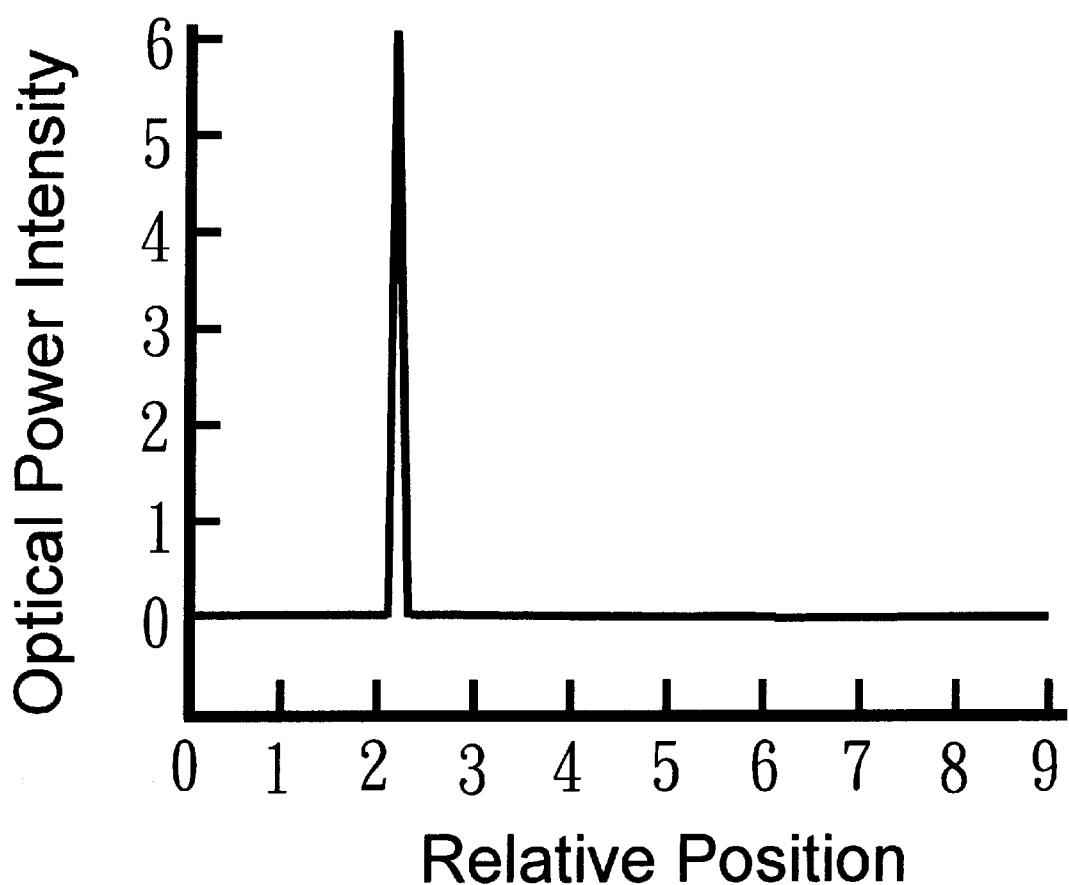
Figure 5C:
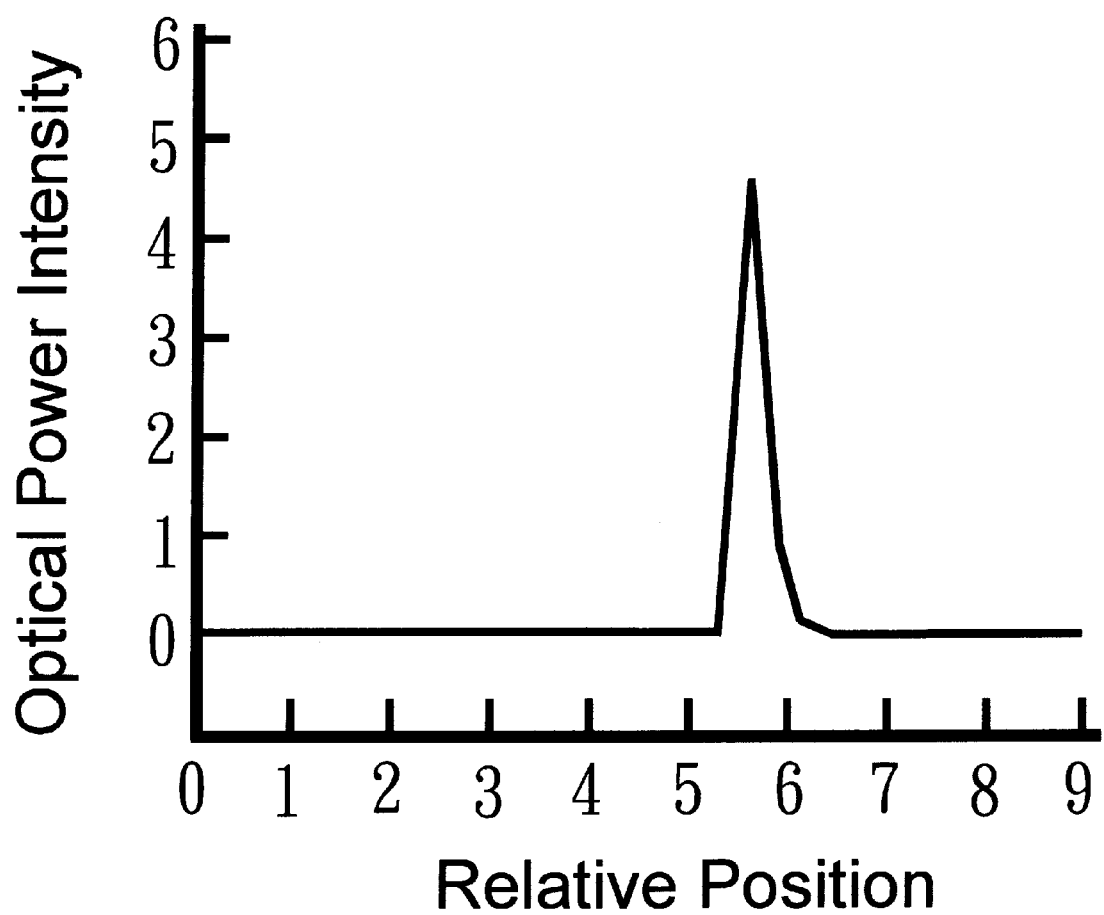
Figure 7:
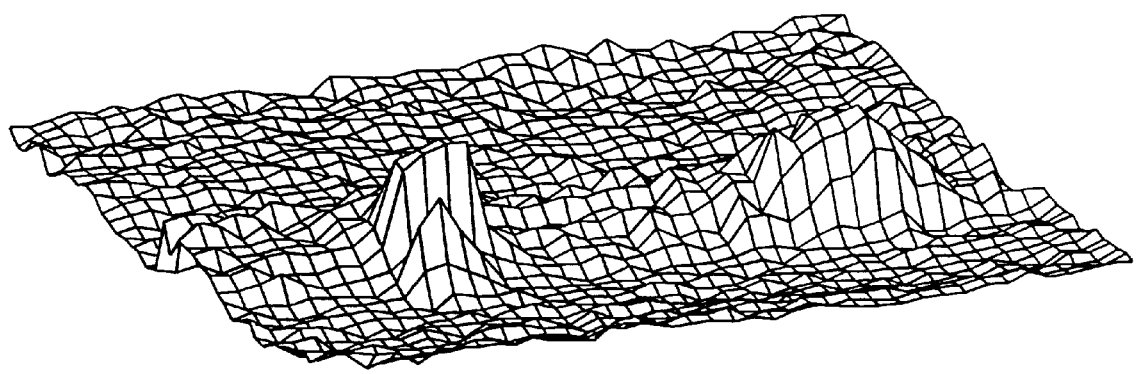
FIGS. 7a, 7b and 7c show measured output power intensity profiles of the splitter with $\theta=0.5°$.
Figure 7:
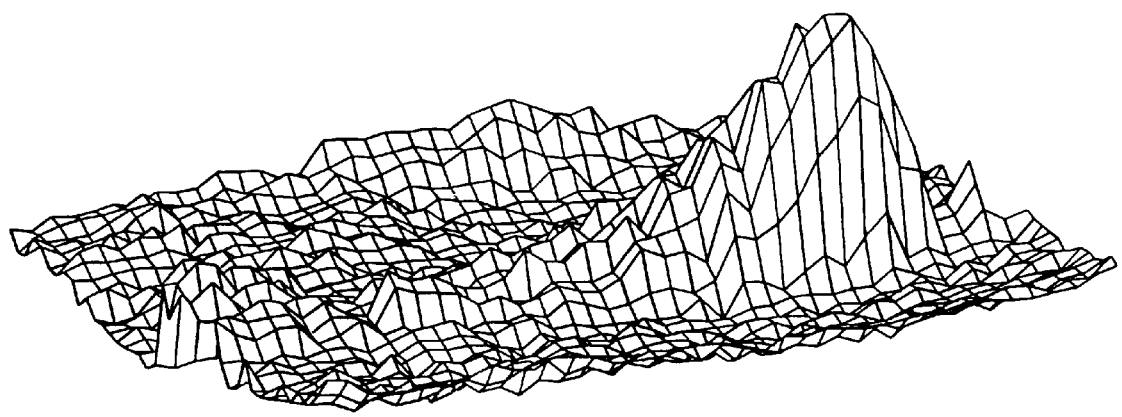
Figure 7:
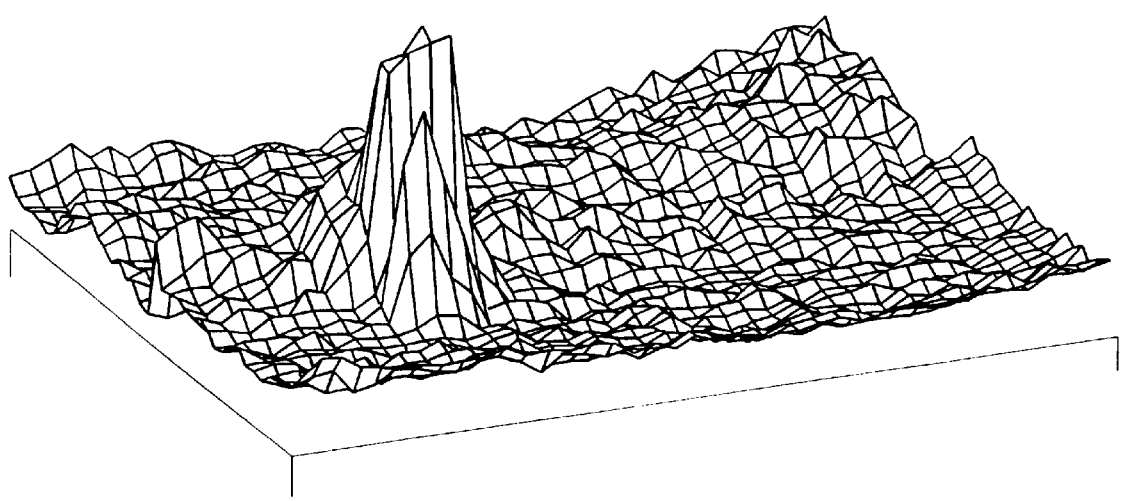

EXAMPLE 3
Manufacturing Process for a Zinc-Nickel Indiffused Polarization Splitter The splitter was manufactured by the technique shown in FIG. 5 and with the manufacturing process parameters shown on table 3, to yield a nickel/zinc indiffused polarization splitter operating at 1.3 μm wavelength. The configuration of element is shown on FIG. 4. When the branch angle θ=0.5°, its operation characteristics, shown as FIG. 7(a), (b), (c), are light signals whose polarization directions have 45°, 0°, 90° angle with the Z-axis, respectively. When polarization is at a 45° angle with the Z-axis, both branch 1 and branch 2 have signals and can be recognized from FIG. 7(a). When the polarization direction has a 0° angle with the Z-axis, only branch 2 has signal.

When the polarization direction has a 90° angle with the Z-axis, only branch 1 has a signal. At 1.3 μm, TE and TM mode extinction ratios are 22 dB and 20 dB.

The benefits and effects of this invention are as follows:
(1) The nickel (or zinc) diffusion polarization splitter manufactured by this process has a high extinction ratio, and is suitable for practical use.
(2) This process is very simple and is suitable for mass production in industry.

TABLE 1

THE FABRICATION PROCESS PARAMETERS FOR EXAMPLE 1

| Waveguide | Ni Width | Ni Thickness | First Diffusion | Second Diffusion |
|---|---|---|---|---|
| Input Branch 1 (TE + TM) | 4 μm | 320Å | 950° C. 2.5 hr | 650° C. 2.5 hr |
| Branch 2 (TE) | 4 μm | 100Å | 950 ° C. 2.5 hr | 650° C. 2.5 hr |
| Branch 3 (TM) | 4 μm | 100Å |  | 650° C. 2.5 hr |

TABLE 2

THE FABRICATION PROCESS PARAMETERS FOR EXAMPLE 2

| Waveguide | Ni Width | Ni Thickness | First Diffusion | Second Diffusion |
|---|---|---|---|---|
| Input Branch 1 (TE + TM) | 12 μm | 700Å | 1000° C. 90 min. | 900° C. 50 min. |
| Branch 2 (TE) | 12 μm | 300Å | 1000° C. 90 min. | 900° C. 50 min. |
| Branch 3 (TM) | 12 μm | 400Å |  | 900° C. 50 min. |

TABLE 3

THE FABRICATION PROCESS PARAMETERS FOR EXAMPLE 3

| Waveguide | Ni/Zn Width | Ni/ZN Thickness | First Diffusion | Second Diffusion |
|---|---|---|---|---|
| Input Branch 1 (TE + TM) | 8 μm | Zn 1000Å Ni 250Å | 1000° C. 90 min. | 900° C. 50 min. |
| Branch 2 (TE) | 8 μm | Zn 500Å Ni 250Å | 1000° C. 90 min. | 900° C. 50 min. |
| Branch 3 (TM) | 8 μm | Ni 480Å |  | 900° C. 50 min. |

What is claimed is:

1. A method of producing a TE-TM mode splitter comprising;

depositing a first layer of nickel or zinc on a lithium niobate chip to form a first strip of nickel or zinc on an area on the surface of the chip, depositing a second layer of nickel or zinc on top of a section of the first layer to form a double layer section of the first strip and a single layer section of the first strip wherein the double layer section is adjacent to the single layer section, diffusing the double layer section of the first strip into a first portion of the lithium niobate chip to form an input terminal which is a waveguide which guides random polarized light and, diffusing the single layer section of the first strip into a second portion of the lithium niobate chip to form a first branch which is a waveguide which guides ordinary polarized light, depositing a third layer of nickel on the lithium niobate chip to form a second strip with a first end wherein the first end of the second strip intersects at an angle the area on the surface of the lithium niobate chip on which the first strip was deposited, diffusing the third layer of nickel into the lithium niobate chip to form a second branch which is a waveguide which guides extraordinary polarized light.

2. The method of claim 1 wherein the first, second and third layers are deposited with a thickness of from 100 to 1000 Å.

3. The method of claim 1 wherein the first and second layer is nickel.

4. The method of claim 1 wherein the third layer is nickel.

5. The method of claim 1 wherein the diffusion of the double layer and the diffusion of the single layer is by heating the lithium niobate chip at a temperature of from 800 to 1100° C. for a duration of from 0.5 to 3 hours.

6. The method of claim 1 wherein the diffusion of the third layer is by heating the lithium niobate chip at a temperature of from 500 to 1000° C. for a duration of from 0.5 to 3 hours.

7. The method of claim 1 wherein the first, second and third layers are deposited with a thickness of from 100 to 1000 Å.

8. The method of claim 1 wherein the first, second and third layers are deposited with a thickness of from 100 to 1000 Å and the diffusion of the double layer and the diffusion of the single layer is by heating the lithium niobate chip at a temperature of from 800 to 1100° C. for a duration of from 0.5 to 3 hours and wherein the diffusion of the third layer is by heating the lithium niobate chip at a temperature of from 500 to 1000° C. for a duration of from 0.5 to 3 hours.

9. A method of producing an extraordinary polarized light waveguide comprising;

depositing a layer of zinc on a lithium niobate chip to form a strip of zinc on the surface of the chip, the strip having a width of from 1 to 12 μm and a thickness of from 300 to 1500 Å, oxidizing the lithium niobate chip at a temperature of from 300 to 500° C. for a duration of from 0.5 to 3 hr, and diffusing the zinc strip into the lithium niobate chip at a temperature of from 600 to 1000° C. for a duration of from 0.5 to 5 hr.

10. A method of producing an ordinary polarized light waveguide comprising;

depositing a layer of zinc on a lithium niobate chip to form a strip of zinc on the surface of the chip, the strip having a width of from 1 to 12 μm and a thickness of from 500 to 1500 Å, oxidizing the lithium niobate chip at a temperature of from 300 to 400° C. for a duration of from 0.5 to 3 hr, and diffusing the zinc strip into the lithium niobate chip at a temperature of from 900 to 1050° C. for a duration of from 1 to 5 hr.

11. A method of producing a light waveguide comprising;

depositing a layer of nickel on a lithium niobate chip to form a strip of nickel on the surface of the chip, the strip being a first layer having a width of from 1 to 12 µm and a thickness of from 20 to 300 Å, depositing a second layer of zinc on top of the first layer of nickel, the second layer having a thickness of from 300 to 1500 Å, oxidizing the lithium niobate chip at a temperature of from 300 to 500° C. for a duration of from 0.5 to 3 hr, and diffusing the nickel layer and the zinc layer into the lithium niobate chip at a temperature of from 600 to 1000° C. for a duration of from 0.5 to 5 hr.

12. A method of producing a TE-TM mode splitter comprising;

depositing a first layer of nickel on a lithium niobate chip to form a first strip of nickel on an area on the surface of the chip, depositing a second layer of zinc on top the first strip of nickel form a double layer on the first strip, depositing a third layer of zinc on top of a section of the double layer to form a triple layer section of the first strip and a double layer section of the first strip wherein the triple layer section is adjacent to the double layer section, diffusing the triple layer section of the first strip into a first portion of the lithium niobate chip to form an input terminal which is a waveguide which guides random polarized light, diffusing the double layer section of the first strip into a second portion of the lithium niobate chip to form a first branch which is a waveguide which guides ordinary polarized light, depositing a fourth layer of nickel on the lithium niobate chip to form a second strip with a first end wherein the first end of the second strip intersects at an angle the area on the surface of the lithium niobate chip on which the first strip was deposited, and diffusing the fourth layer of nickel into the lithium niobate chip to form a second branch which is a waveguide which guides extraordinary polarized light.

13. The method of claim 12 wherein the first, second, third and fourth layers are deposited with a thickness of from 100 to 1000 Å.

14. The method of claim 12 wherein the diffusion of the triple layer and the diffusion of the double layer is by heating the lithium niobate chip at a temperature of from 800 to 1100° C. for a duration of from 0.5 to 3 hours.

15. The method of claim 12 wherein the diffusion of the fourth layer is by heating the lithium niobate chip at a temperature of from 500 to 1000° C. for a duration of from 0.5 to 3 hours.

16. The method of claim 12 wherein the first, second, third and fourth layers are deposited with a thickness of from 100 to 1000 Å and the diffusion of the triple layer and the diffusion of the double layer is by heating the lithium niobate chip at a temperature of from 800 to 1100° C. for a duration of from 0.5 to 3 hours and wherein the diffusion of the fourth layer is by heating the lithium niobate chip at a temperature of from 500 to 1000° C. for a duration of from 0.5 to 3 hours.

* * * * *